US009835894B2

(12) United States Patent
Yang et al.

(10) Patent No.: US 9,835,894 B2
(45) Date of Patent: Dec. 5, 2017

(54) ENCAPSULATED POLYMER STABILIZED CHOLESTERIC TEXTURE LIGHT SHUTTER

(71) Applicants: Deng-Ke Yang, Hudson, OH (US); Yue Cui, Kent, OH (US); Cuiyu Zhang, Kent, OH (US)

(72) Inventors: Deng-Ke Yang, Hudson, OH (US); Yue Cui, Kent, OH (US); Cuiyu Zhang, Kent, OH (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 15/065,047

(22) Filed: Mar. 9, 2016

(65) Prior Publication Data

US 2016/0187681 A1 Jun. 30, 2016

Related U.S. Application Data

(62) Division of application No. 13/908,446, filed on Jun. 3, 2013, now Pat. No. 9,304,350.

(60) Provisional application No. 61/654,148, filed on Jun. 1, 2012.

(51) Int. Cl.
| | |
|---|---|
| *G02F 1/1333* | (2006.01) |
| *G02F 1/1334* | (2006.01) |
| *B05D 5/06* | (2006.01) |
| *G02F 1/1343* | (2006.01) |
| *G02F 1/137* | (2006.01) |

(52) U.S. Cl.
CPC .......... *G02F 1/1334* (2013.01); *B05D 5/065* (2013.01); *G02F 1/137* (2013.01); *G02F 1/13439* (2013.01); *G02F 2001/13775* (2013.01)

(58) Field of Classification Search
None
See application file for complete search history.

(56) References Cited

U.S. PATENT DOCUMENTS

| | | | | |
|---|---|---|---|---|
| 2007/0152928 | A1* | 7/2007 | Doane | G02F 1/133305 345/87 |
| 2010/0047593 | A1* | 2/2010 | Higashida | G02F 1/172 428/447 |
| 2012/0088320 | A1* | 4/2012 | Hwang | B29D 11/00788 438/27 |
| 2012/0113362 | A1* | 5/2012 | Lim | G02F 1/1323 349/96 |

* cited by examiner

*Primary Examiner* — Richard Kim
(74) *Attorney, Agent, or Firm* — Renner, Kenner, Greive, Bobak, Taylor & Weber Co. LPA

(57) ABSTRACT

An encapsulated polymer stabilized cholesteric texture (EP-SCT) light shutter is formed from a cholesteric liquid crystal and monomer that is encapsulated into micron sized, polymer-coated droplets by either an emulsification or phase separation process. The polymer-coated droplets are disposed between transparent electrodes, where they are irradiated by ultra-violet (UV) light to polymerize the monomer.

20 Claims, 4 Drawing Sheets

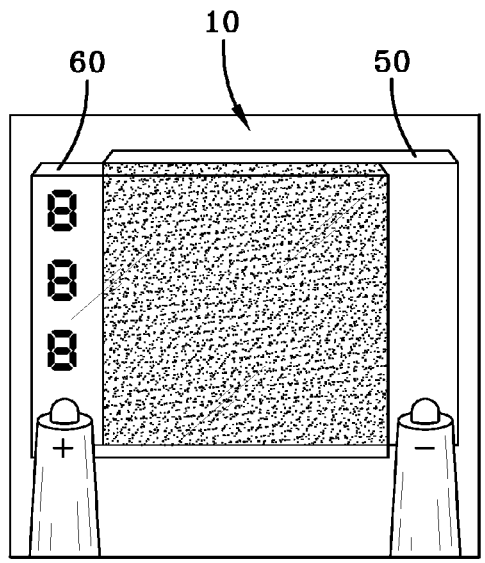 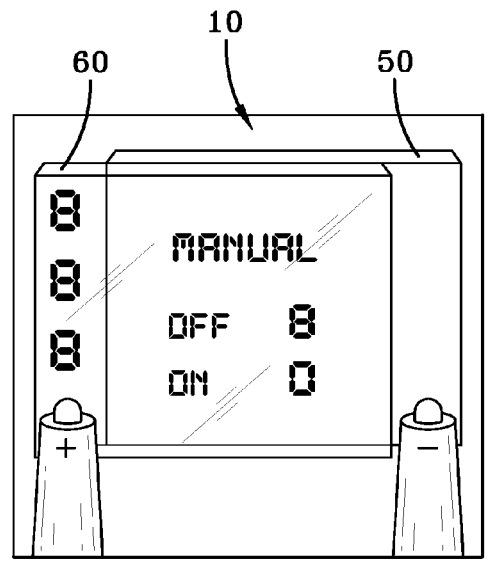
FIG-4a  FIG-4b
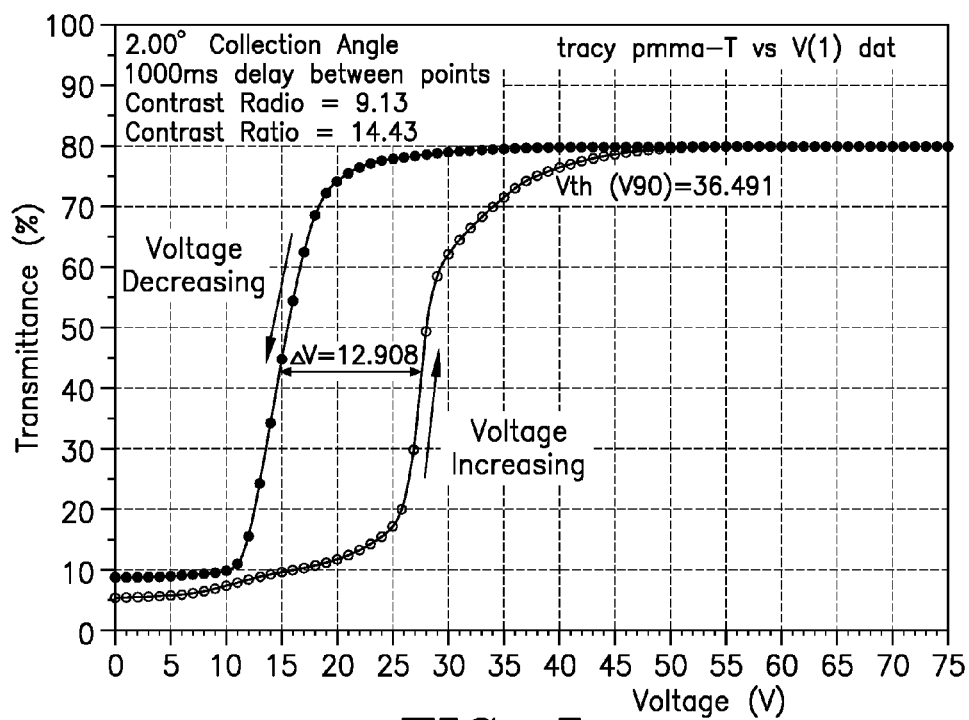
FIG-5

ENCAPSULATED POLYMER STABILIZED CHOLESTERIC TEXTURE LIGHT SHUTTER

CROSS-REFERENCE TO RELATED APPLICATIONS

This application is a division of U.S. non-provisional application Ser. No. 13/908,446 filed on Jun. 3, 2013, which claims the benefit of U.S. Provisional Application No. 61/654,148 filed on Jun. 1, 2012, the contents of which are incorporated herein by reference.

TECHNICAL FIELD

The present invention generally relates to liquid crystal light shutters. In particular, the present invention relates to a light shutter formed of a liquid crystal/polymer composite material. More particularly, the present invention relates to a light shutter formed of a liquid crystal/polymer composite material that is encapsulated into droplets, which allows the light shutter to be highly transparent and have a large viewing angle.

BACKGROUND

Liquid crystal/polymer composites, such as those used to form polymer dispersed liquid crystals (PDLCs) and polymer stabilized cholesteric texture (PSCT) light shutters, have been used to make flexible displays, transparent displays and switchable windows. In a PDLC, the concentrations of the polymer and the nematic liquid crystal material in the composite are comparable; however, the nematic liquid crystal exists in isolated droplets that are dispersed in the polymer, such that the droplet size is comparable to the wavelength of visible light. During operation in the voltage-off state, the liquid crystal inside the droplets orients randomly throughout the PDLC material. Thus, when light propagates through the PDLC material, the encountered effective refractive index in the liquid crystal droplet is different from the encountered refractive index $n_p$ in the polymer, causing the light to scatter through the material, and as a result, the PDLC material appears opaque. When a sufficiently high electric field is applied across the PDLC material, the liquid crystal inside the droplets is aligned uniformly along the applied field (film normal direction). Thus, in the case of normal incident light, when it propagates through the liquid crystal droplet, the effective refractive index encountered by the light propagating through the PDLC material is the ordinary refractive index $n_0$ of the liquid crystal, which is matched to the refractive index $n_p$ of the polymer. As a result, the light is permitted to be transmitted through the PDLC material causing it to become transparent.

In a polymer stabilized cholesteric texture (PSCT) light shutter, the polymer concentration of the composite material is usually less than 5%, and it exists in the form of anisotropic networks, which are dispersed in a cholesteric liquid crystal. The liquid crystal exists in domains with a size comparable to the wavelength of visible light. In one voltage state, the orientation of the liquid crystals in the domains is random in the PSCT material, such that the refractive index changes from domain to domain resulting in a material that is light scattering. In another voltage state, the liquid crystals in the domains are uniformly aligned in one direction, and as a result, the refractive index of the PSCT material does not vary, allowing the material to become transparent. Thus, the PSCT material can be switched between a light scattering state and a transparent state by applying the appropriate voltage or lack of voltage to the PSCT material.

Furthermore, polymer dispersed liquid crystals (PDLCs) are self-adhesive, can be easily manufactured by a roll-to-roll process, and may be formed to take up a large area. Unfortunately, PDLCs have a limited viewing angle because the refractive indices of the polymer and the liquid crystal are only matched for light incident on the cell (substrate) in a normal direction. In contrast, polymer stabilized cholesteric texture (PSCTs) liquid crystals have a large viewing angle, because the liquid crystal and the dispersed polymer network are aligned in the same direction in the transparent state, and because their refractive indices are matched for light incident in any direction. However, it is difficult to manufacture PSCTs using a roll-to-roll manufacturing process because of the low viscosity of the liquid crystal/monomer composite mixture.

Therefore, there is a need for an encapsulated polymer stabilized cholesteric texture (EPSCT) light shutter that is self-adhesive. In addition, there is a need for an encapsulated polymer stabilized cholesteric texture light shutter that has a large viewing angle. Furthermore, there is a need for an encapsulated polymer stabilized cholesteric texture light shutter that can be manufactured using a roll-to-roll process. Moreover, there is a need for an encapsulated polymer stabilized cholesteric texture light shutter that combines the benefits of a polymer dispersed liquid crystal (PDLC) and a polymer stabilized cholesteric texture (PSCT) device.

SUMMARY OF THE INVENTION

In light of the foregoing, it is a first aspect of the present invention to provide a method of forming a light shutter comprising mixing a liquid crystal material with a monomer material and a polymer; encapsulating the liquid crystal material and the monomer material into one or more polymer-shelled droplets formed by the polymer by either an emulsion process or a phase separation process, whereby the droplets are disposed in the polymer; disposing the one or more polymer-shelled droplets and the polymer between a pair of conductive at least partially light transparent electrodes; and polymerizing the monomer.

It is another aspect of the present invention to provide a light shutter comprising first and second spaced electrodes, wherein at least one of the electrodes is at least partially transparent; a polymer disposed between the first and second electrodes; and at least one droplet having a shell formed of the polymer, the at least one droplet carried in the polymer, such that the at least one droplet carries a mixture of liquid crystal material and a polymerized monomer; wherein when a first voltage is applied to the first and second electrode, the liquid crystal material is placed in a light scattering state, and when a second voltage is applied to the first and second electrodes, the liquid crystal material is placed in an at least partially light transparent state.

BRIEF DESCRIPTION OF THE DRAWINGS

These and other features and advantages of the present invention will become better understood with regard to the following description, appended claims and accompanying drawings wherein:

FIG. 1a shows the light shutter in a scattering state, and FIG. 1b shows the light shutter in a transparent state in accordance with the concepts of the present invention;

FIGS. 4a-b are schematic view of a photograph of a 10 μm EPSCT light shutter, such that FIG. 4a shows the EPSCT light shutter in a light-scattering state in the absence of voltage, and FIG. 4b shows the EPSCT light shutter in a transparent state when 50V is applied in accordance with the concepts of the present invention;

FIG. 5 shows a chart of light transmittance as a function of voltage applied to the EPSCT light shutter having different thicknesses in accordance with the concepts of the present invention;

FIG. 7a shows the EPSCT light shutter in a light-scattering state in the absence of an applied voltage, and FIG. 7b shows the EPSCT light shutter in a transparent state when 50V is applied thereto in accordance with the concepts of the present invention.

DETAILED DESCRIPTION OF THE INVENTION

Figure 1A:
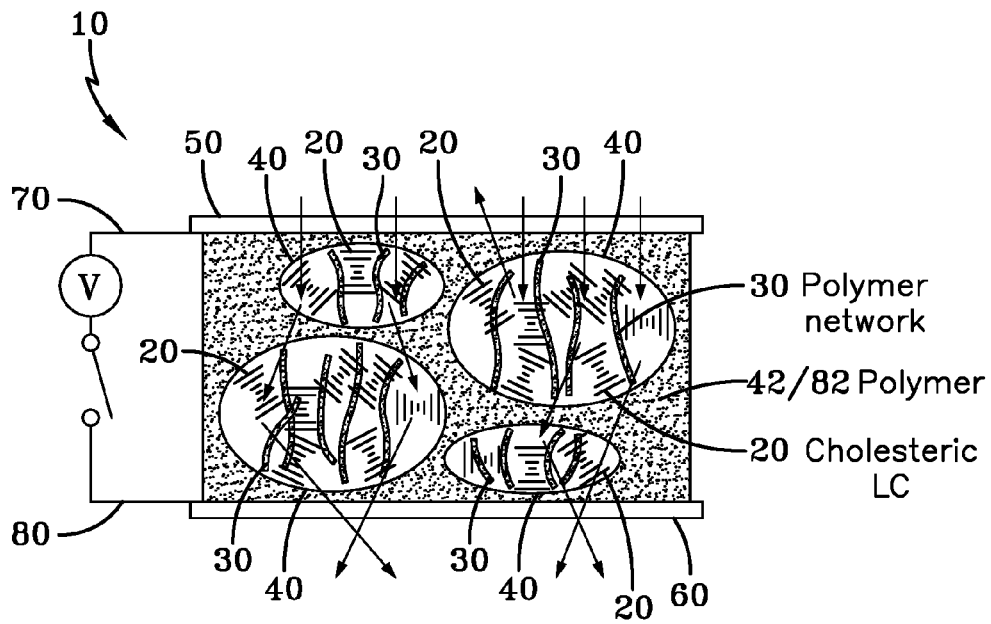
FIGS. 1a-b are schematic drawings showing the manner in which an encapsulated polymer stabilized cholesteric texture (EPSCT) light shutter is operated, whereby

I. Operation of the Encapsulated Polymer Stabilized Cholesteric Texture (EPSCT) Light Shutter An encapsulated polymer stabilized cholesteric texture (EPSCT) light shutter 10 is fabricated in two processing steps. In a first step, a cholesteric liquid crystal 20 and a monomer material 30 that is polymerized at a subsequent time in the process as a polymer network are encapsulated into droplets 40 having a size of about 10 μm, as shown in FIG. 1 of the drawings. It should be appreciated that this encapsulation process may be achieved through either an emulsification method, a phase separation method or by any other suitable method.

In the emulsification method, the liquid crystal material 20 and the monomer material 30 are mixed with water and a water-soluble polymer 42, or other suitable polymerizing initiator. The mixture is then stirred to form shelled droplets, whereby the polymer forms the shell of the droplet, while the liquid crystal 20 and the monomer material 30 are disposed inside the droplets 40. In one aspect, various agents may be added to the mixture to stabilize the droplets 40. The encapsulated material is then sandwiched or otherwise disposed between two substrates 50 and 60 with transparent electrodes 70 and 80.

In the phase separation method, the liquid crystal material 20 and monomer material 30 are combined with a thermoplastic polymer 82, or other suitable polymerizing initiator. The mixture is then sandwiched or otherwise disposed between two at least partially transparent substrates 50,60 with transparent electrodes 70,80 that are configured to be coupled to any suitable voltage source "V", such as an AC (alternating current) or DC (direct current) voltage source. When the combined material is heated to a high temperature, the polymer 42, the liquid crystal 20 and the monomer material 30 are uniformly mixed to form a mixture. When the mixture is cooled, the liquid crystal 20 and the monomer material 30 phase separate from the polymer 82 to form polymer shelled droplets 40. That is, the droplets 40 encapsulate the liquid crystal material 20 and the monomer material 30 in a polymer shell. It should also be appreciated that the substrates 50,60 and corresponding transparent electrodes 70,80 used to form the light shutter 10 may be combined, such that substrates 50,60 form electrically conductive electrodes. In a further aspect, it should be appreciated that either or both of the substrates 50,60 and that either or both of the electrodes 70,80 may be at least partially transparent.

In a second step of forming an encapsulated polymer stabilized cholesteric texture (EPSCT) light shutter 10 using either of the emulsification or phase separation method, the monomer material 30 is polymerized under UV irradiation in the homeotropic texture in the presence of an externally-applied electric field. The liquid crystal 20 has a positive dielectric anisotropy and tends to align parallel to the applied electric field. The formed polymer network 30 is anisotropic and perpendicular to the cell substrate and divides the liquid crystal 20 into domains with a size comparable to the wavelength of visible light.

Figure 1B:
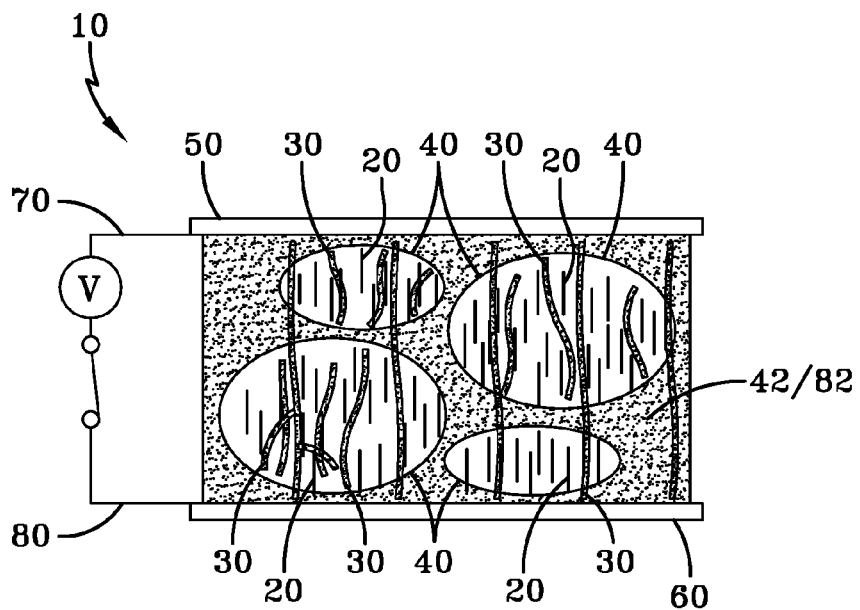

The operation of the encapsulated polymer stabilized cholesteric texture (EPSCT) light shutter 10 is shown in FIG. 1 of the drawings. Specifically, in the absence of an electric field, the liquid crystals 20 are placed in the polydomain focal conic texture, as shown in FIG. 1a, such that the refractive index is varied in space causing the EPSCT material to be highly light scattering. The scattering of light is mainly caused by the abrupt refractive index change between the domains of the liquid crystals 20. When a sufficiently high voltage is applied across the EPSCT cell 10, as shown in FIG. 1b, the helical structure of the liquid crystals (with $\Delta \epsilon > 0$) is unwound, and the liquid crystals 20 are uniformly aligned parallel to the polymer network 30, thus causing the EPSCT light shutter 10 to become transparent.

It should be appreciated that the light shutter 10 of the present invention may serve as a single cell, which is combined in a matrix of a plurality of similar cells to form a larger overall light shutter. Alternatively, the components of the light shutter 10 may be configured to take on any desired dimension and suitable shape.

II. Experimental Results

Example 1: Emulsification Method

During the formation of the encapsulated polymer stabilized cholesteric texture (EPSCT) light shutter 10 using the emulsification method, water-soluble Polyvinyl Alcohol (PVA) was used, such that the concentrations of the materials were about: 46% water; 8.1% PVA; 2.7% surfactant; and 43.2% liquid crystal/monomer mixture. The solution was placed into a bottle and stirred by spinning a magnet carried inside the bottle. The spinning speed of the magnet was one of the factors controlling the droplet size, and as such, the spinning speed was set at about 500 RPM (revolutions per minute). The stirring time was about 15 seconds, and the liquid crystal/monomer mixture was emulsified into droplets having a size of about 10-20 μm.

The emulsion may be coated on either a glass plate or on PET (polyethylene terephthalate) film with ITO (indium-tin-oxide) electrodes. A doctor blade was used in the coating process to produce a uniform film thickness without breaking the droplets. The emulsion was allowed to dry in air for several hours. In addition, a second substrate was laminated on the top of the emulsion. In one aspect, heating the emulsion may be performed to soften the material to assist its adherence to the top substrate.

In the final dried emulsion, the concentration of the liquid crystal/monomer was about 80%. The cholesteric liquid crystals (LCs) were made from nematic E44 liquid crystal material and chiral dopant R811 material, while the monomer comprised RM257 material, which is bi-functional. The pitch of the cholesteric liquid crystals were about 1 μm, and the ratio between the liquid crystals and the monomer was about 97:3. A very small amount of photo-initiator was also added into the mixture before the emulsification process was carried out. During the UV (ultra-violet light) curing process, a sufficiently high voltage was applied across the encapsulated polymer stabilized cholesteric texture (EPSCT) light shutter, such that the mixture was in the homeotropic texture where the helical structure of the liquid crystals were unwound, such that the liquid crystals became aligned in the cell normal direction. The formed polymer network was anisotropic and in the same direction as the liquid crystal during the polymerization. The UV intensity was 10 mW/cm$^2$, and the curing time was about 30 minutes.

Figure 2:
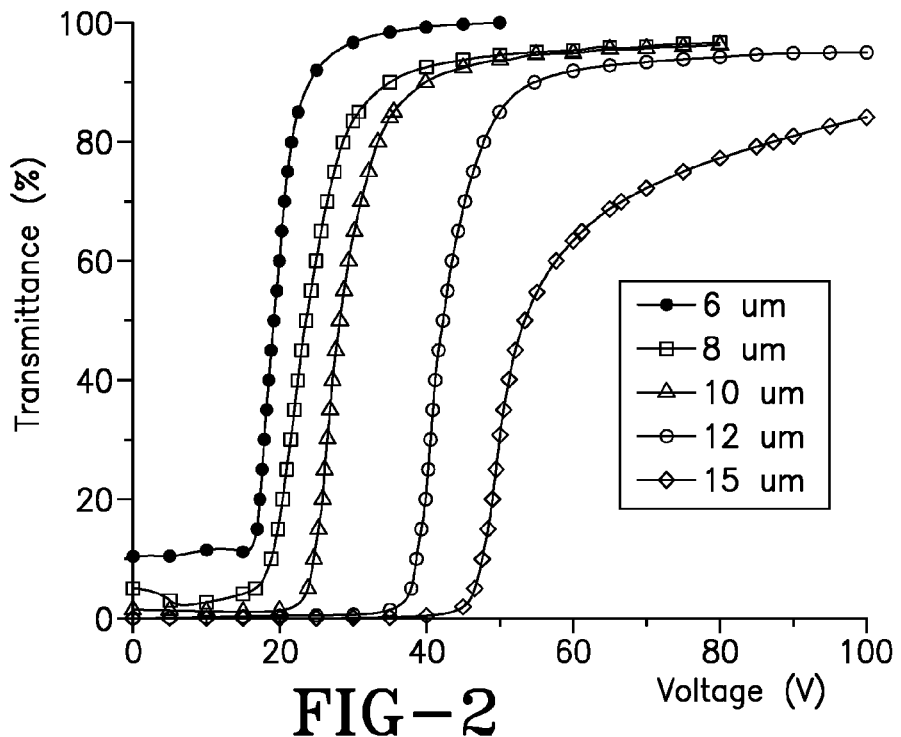
FIG. 2 is a chart showing the transmittance as a function of applied voltage for EPSCT light shutters having different film thicknesses in accordance with the concepts of the present invention.

The light transmittance of the encapsulated polymer stabilized cholesteric texture (EPSCT) light shutter 10 at various thicknesses (such as 6, 8, 10, 12, and 15 um for example), as a function of the applied voltage is shown in FIG. 2. Specifically, in the absence of an applied voltage, the light shutter 10 is placed in a light-scattering state, whereby its light transmittance is low. Alternatively, when the voltage applied to the light shutter 10 is increased, the light transmittance of the light shutter 10 increases. Finally, when sufficiently high voltages are applied to the EPSCT light shutter 10 of the present invention, the light shutter 10 is switched to a substantially transparent state, where its light transmittances are high.

Figure 3:
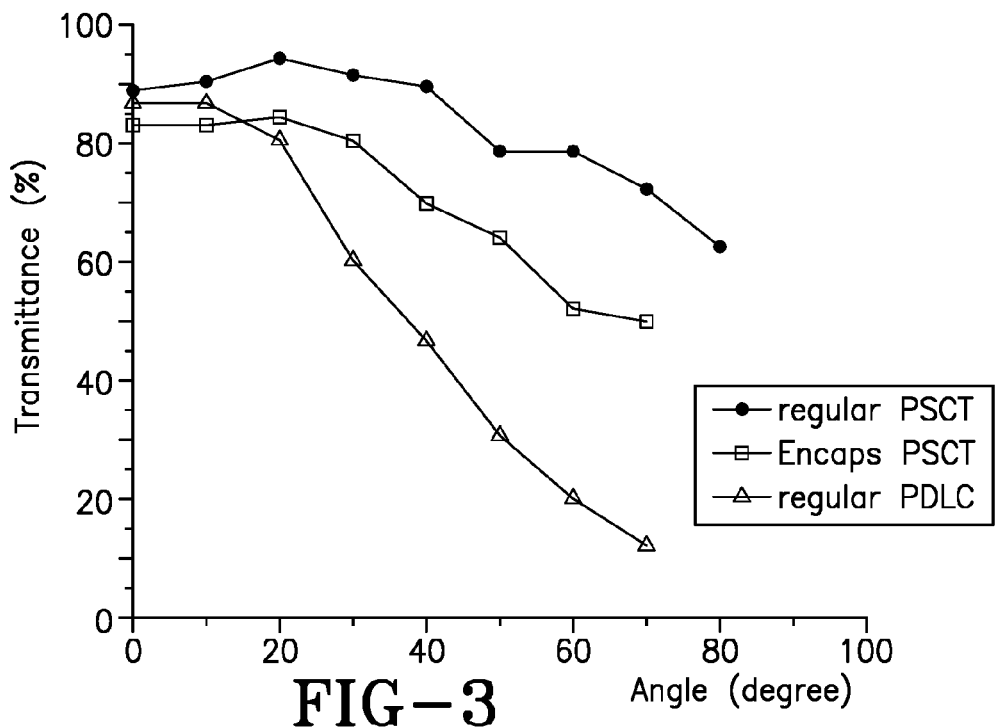
FIG. 3 is a chart showing light transmittance as a function of the incident viewing angle of standard polymer dispersed liquid crystal (PDLC) and polymer stabilized cholesteric texture (PSCT) light shutters versus an encapsulated polymer stabilized cholesteric texture (EPSCT) light shutter of the present invention, where a voltage of 50V was applied for all measurements.

In addition, the encapsulated polymer stabilized cholesteric texture (EPSCT) light shutter 10 of the present invention was able to achieve a large viewing angle, which is a major advantage over polymer dispersed liquid crystal (PDLC) devices. To conduct the measurement, a 10 μm thick EPSCT film 10 was immersed in glycerol (whose refractive index matching with glass) contained in a glass cylinder. The EPSCT light shutter 10 was then rotated to change the light incident angle. For comparison with the EPSCT light shutter 10, the viewing angle of a regular polymer dispersed liquid crystal (PDLC) and a regular polymer stabilized cholesteric texture (PSCT) light shutter were measured. The regular PSCT sample light shutter was made from the same mixture as the EPSCT light shutter 10 of the present invention and cured under the same conditions. The regular PDLC sample was made from polyvinyl alcohol (PVA) and E44 emulsion with much smaller droplets (<1 μm), and coated with the same procedure as the EPSCT light shutter 10 of the present invention. Both the regular PDLC light shutter and the regular PSCT light shutter (control shutters) also had a film thickness of 10 μm. The light transmittance of the regular PDLC and regular PSCT light shutters, and the EPSCT light shutter 10 in the transparent state as a function of the incident angle is shown in FIG. 3. Specifically, FIG. 3 shows that the EPSCT light shutter 10 of the present invention had a much better viewing angle than the regular PDLC light shutter.

Continuing, schematic views of the encapsulated polymer stabilized cholesteric texture (EPSCT) light shutter 10 of the present invention are shown in FIGS. 4a-b. Specifically, when no voltage was applied, the light shutter 10 is placed in a light-scattering state, and appeared milky in color, such that it blocked the scene/image that was located behind the EPSCT light shutter 10, as shown in FIG. 4a. When a voltage with an amplitude of 50 V was applied, the EPSCT light shutter 10 was switched to a transparent state, whereby and the scene/image that was located behind the EPSCT light shutter 10 was able to be seen as shown in FIG. 4b.

Example 2: Phase Separation Method

In the phase separation method of forming the light shutter 10, a cholesteric liquid crystal and monomer were mixed with a polymer, such as poly(methyl methacrylate) (PMMA). The concentration of PMMA was about 20% and the concentration of the liquid crystal and monomer material was about 80%. The liquid crystal/monomer mixture comprised about 83.7% nematic liquid crystal E44, about 13.0% chiral dopant R811, about 3.0% monomer R.M257 and about 0.3% photo-initiator BME (benzoin methyl ester). The liquid crystal, monomer and polymer were mixed and sandwiched between two glass substrates and transparent indium-tin-oxide (ITO) electrodes to form the encapsulated polymer stabilized cholesteric texture (EPSCT) light shutter 10. Moreover, the thickness of the thickness of the light shutter 10 defined by the space between the pair of electrodes/substrate, was about 20 μm. In addition, the light shutter 10 was heated above about 120° C. and then cooled down to room temperature at the cooling rate of about −0.1 degree/minute. Finally, the light shutter 10 was placed under ultra-violet (UV) light to polymerize the monomer. Thus, when sufficiently high voltages were applied, the light shutter 10 was switched to a transparent state, whereupon its light transmittances became high. It should also be appreciated that the light shutter formed using the phase separation method also achieved a large viewing angle. Moreover, FIG. 5 shows the light transmittance of the encapsulated polymer stabilized cholesteric texture (EPSCT) light shutter 10 for varying applied voltages.

Figure 6:
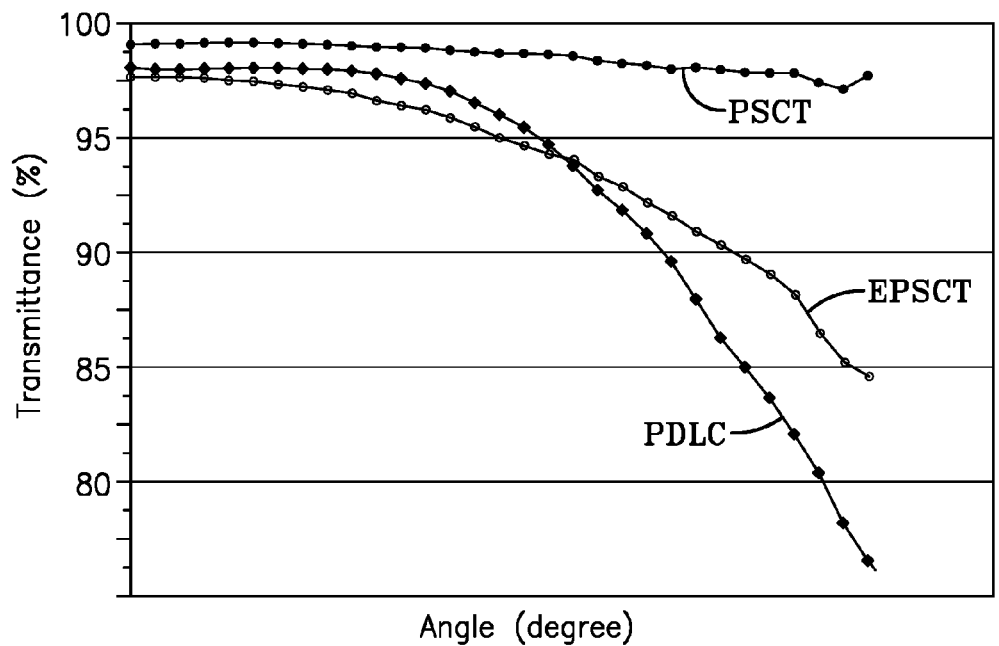
FIG. 6 is a chart showing light transmittance as a function of incident viewing angle of the encapsulated polymer stabilized cholesteric texture (EPSCT) light shutter, as compared to that of a regular polymer stabilized cholesteric texture (PSCT) and polymer dispersed liquid crystal (PDLC) light shutter in the transparent state in accordance with the concepts of the present invention.

Next, the light transmittance of the EPSCT light shutter 10 of the present invention in the transparent state as a function of the light incident angle was also evaluated, as shown in FIG. 6 of the drawings. As such, the EPSCT light shutter 10 achieved a better viewing angle than the regular PDLC light shutter.

Figure 7A:
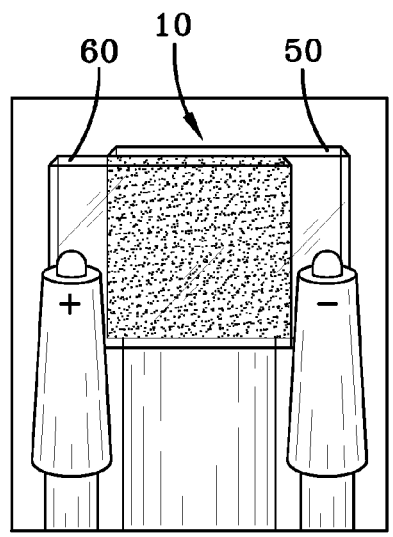
FIGS. 7a-b are schematic views of photographs of the EPSCT light shutter, whereby
Figure 7B:
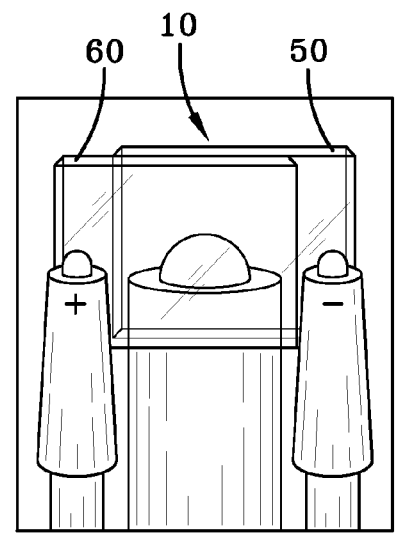

In addition, schematic views of photographs of the encapsulated polymer stabilized cholesteric texture (EPSCT) light shutter 10 are shown in FIGS. 7a-b of the drawings. Specifically, when no voltage was applied, the EPSCT light shutter 10 was in the light scattering state, and appeared milky, so as to block the scene/image located behind the light shutter 10, as shown in FIG. 7a. When a voltage with an amplitude of 50 V was applied, the EPSCT light shutter 10 of the present invention was switched to the transparent state and the scene or image disposed behind the light shutter 10 was able to be seen therethrough by a viewer, as shown in FIG. 7b.

Therefore, one advantage of an encapsulated polymer stabilized cholesteric texture (EPSCT) light shutter of the present invention is that it is self-adhesive and can be manufactured in a roll-to-roll process. Another advantage of the encapsulated polymer stabilized cholesteric texture (EPSCT) light shutter is that it has a highly transparent state and large viewing angle. Still another advantage of the encapsulated polymer stabilized cholesteric texture (EPSCT) light shutter of the present invention is that it can be used for various applications, including flexible displays, switchable privacy windows, and energy-saving architectural windows, which is highly desirable.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method of forming a light shutter comprising:
    providing a polymer material;
    fully encapsulating a liquid crystal material and a monomer material into one or more shells formed by the polymer material;
    disposing the polymer material and the shells included therein between a pair of conductive at least partially light transparent electrodes; and
    polymerizing the monomer material to form a polymer network within the shells.

2. The method of claim 1, wherein the polymer material comprises a mixture of water and a water soluble polymer, and
    wherein the encapsulating step is carried out by:
    mixing the liquid crystal material, the monomer material, and the polymer material together.

3. The method of claim 2, wherein the disposing step is carried out by coating the mixed liquid crystal material, the monomer material, and the polymer material onto one of the electrodes.

4. The method of claim 1, wherein the polymer material comprises a thermoplastic polymer, and wherein the encapsulating step is carried out by:
    heating a mixture of the liquid crystal material, the monomer material, and the thermoplastic polymer; and
    cooling the mixture.

5. The method of claim 1, wherein the electrodes comprise indium-tin-oxide (ITO).

6. The method of claim 1, wherein the polymerizing step is carried out by exposing the monomer material to UV (ultraviolet) light.

7. The method of claim 6, wherein the polymerizing step further includes:
    exposing the monomer material to an electric field.

8. The method of claim 1, wherein the size of the one or more shells is about 1 to 100 µm.

9. The method of claim 1, wherein the disposing step is performed by a roll-to-roll process.

10. The method of claim 1, wherein the liquid crystal material comprises nematic liquid crystal material.

11. The method of claim 1, wherein the liquid crystal material is chiral nematic liquid crystal material or cholesteric liquid crystal material.

12. A light shutter comprising:
    a pair of at least partially light transparent electrodes;
    a polymer material disposed between the electrodes;
    a plurality of shells entirely formed by the polymeric material; and
    liquid crystal material stabilized within the shells by a polymer network.

13. The light shutter of claim 12, wherein the electrodes are formed of indium-tin-oxide (ITO).

14. The light shutter of claim 12, wherein the liquid crystal material comprises nematic liquid crystal material.

15. The light shutter of claim 12, wherein the light shutter is self-adhesive.

16. The light shutter of claim 12, wherein the polymer network is substantially perpendicular to at least one of the electrodes and divides the liquid crystal material into a plurality of domains.

17. The method of claim 12, wherein the liquid crystal material is chiral nematic liquid crystal material or cholesteric liquid crystal material.

18. A method of forming a light shutter comprising:
    providing a polymer material;
    fully encapsulating liquid crystal material into a plurality of shells within the polymer material; and
    stabilizing the liquid crystal material within the shells by a polymer network.

19. The method of claim 18, wherein the liquid crystal material comprises nematic liquid crystal material.

20. The method of claim 18, further comprising:
    disposing the polymer between a pair of at least partially light transparent electrodes.

* * * * *